(12) United States Patent
Liang

(10) Patent No.: US 10,896,776 B2
(45) Date of Patent: Jan. 19, 2021

(54) NANO MAGNETO-RHEOLOGICAL FLUID AND PREPARATION METHOD AND DEVICE THEREOF

(71) Applicant: Hunan Bohai New Materials Co., Ltd., Changsha, Hunan (CN)

(72) Inventor: Yanling Liang, Hunan (CN)

(73) Assignee: HUNAN BOHAI NEW MATERIALS CO., LTD., Hunan (CN)

( * ) Notice: Subject to any disclaimer, the term of this patent is extended or adjusted under 35 U.S.C. 154(b) by 333 days.

(21) Appl. No.: 15/807,146

(22) Filed: Nov. 8, 2017

(65) Prior Publication Data

US 2018/0130583 A1 May 10, 2018

Related U.S. Application Data

(63) Continuation of application No. PCT/CN2016/096635, filed on Aug. 25, 2016.

(30) Foreign Application Priority Data

Aug. 28, 2015 (CN) .......................... 2015 1 0537836
Aug. 28, 2015 (CN) .......................... 2015 1 0538070

(51) Int. Cl.
*H01F 1/44* (2006.01)
*H01F 1/00* (2006.01)
*H01F 1/057* (2006.01)
*B82Y 25/00* (2011.01)
*B82Y 30/00* (2011.01)

(52) U.S. Cl.
CPC .......... *H01F 1/447* (2013.01); *H01F 1/0045* (2013.01); *H01F 1/0571* (2013.01); *B82Y 25/00* (2013.01); *B82Y 30/00* (2013.01); *H01F 1/0054* (2013.01)

(58) Field of Classification Search
CPC .................................................... H01F 1/447
See application file for complete search history.

(56) References Cited

U.S. PATENT DOCUMENTS

| | | | |
|---|---|---|---|
| 2,575,360 A | 11/1951 | Rabinow | |
| 2,661,825 A | 12/1953 | Winslow | |
| 2,886,151 A | 5/1959 | Winslow | |
| 5,147,573 A | 9/1992 | Chagnon | |
| 8,137,459 B2* | 3/2012 | Paton | B22F 1/0022 117/105 |
| 9,129,732 B2* | 9/2015 | Rwei | H01F 1/447 |
| 10,344,201 B2* | 7/2019 | Araki | C09K 8/035 |
| 2006/0033068 A1 | 2/2006 | Cheng et al. | |
| 2009/0236558 A1 | 9/2009 | Kobayashi et al. | |

FOREIGN PATENT DOCUMENTS

| | | |
|---|---|---|
| CN | 1414075 A | 4/2003 |
| CN | 101071670 A | 11/2007 |
| CN | 10712904 A | 5/2010 |
| CN | 101712904 A | 5/2010 |
| CN | 101830515 A | 9/2010 |
| CN | 103187137 A | 7/2013 |
| CN | 103337330 | * 10/2013 |
| CN | 103337330 A | 10/2013 |
| CN | 103846161 A | 6/2014 |
| CN | 103896342 A | 7/2014 |
| CN | 04064315 A | 9/2014 |
| CN | 104064315 | * 9/2014 |
| CN | 104064315 A | 9/2014 |
| CN | 103846161 B | 11/2014 |
| CN | 104565272 A | 4/2015 |
| CN | 104575915 A | 4/2015 |
| CN | 205282210 U | 6/2016 |
| CN | 106486240 B | 1/2019 |
| JP | 5020557 A | 3/1975 |
| JP | 5144579 A | 4/1976 |
| JP | 0661032 A | 3/1994 |
| JP | 10-270233 A | 10/1998 |
| JP | 2002075724 A | 3/2002 |
| JP | 3646461 B2 | 5/2005 |
| JP | 2006114751 A | 4/2006 |

(Continued)

OTHER PUBLICATIONS

Translation of CN 103337330, Oct. 2, 2013.*
Translation of CN 104064315, Sep. 24, 2014.*
First Chinese Search Report dated Nov. 20, 2017 in regard to CN Application No. CN15/807146 filed Nov. 8, 2017.
International Search Report for International Application No. PCT/CN2016/096635 dated Dec. 1, 2016.
Supplementary EP Search Report Completed on Feb. 20, 2019.
JPO Notification of Refusal in regards to JP 2018-529704 published on Oct. 30, 2018.
JPO Notification of Refusal in regards to JP 2018-529704 published on Mar. 15, 2019.

(Continued)

*Primary Examiner* — C Melissa Koslow
(74) *Attorney, Agent, or Firm* — Robert L. Stearns; Dickinson Wright PLLC

(57) ABSTRACT

A nano magneto-rheological fluid, comprising nano-scale magnetizable magnetic particles, wherein an average particle size or a minimum size in one dimension is less than 100 nanometers; and fluids used as carrier liquids, wherein the magnetic particles are dispersively distributed in the fluids. An apparatus for making the nanometric magneto-rheological fluid including a ball mill, a settling separator located downstream of the ball mill for receiving the primary magnetic particles, a magnetic separator located downstream of and connected to the settling separator for receiving the upper layer of fluid containing fine magnetic particles, and an agitator for mixing the desired secondary magnetic particles with a carrier liquid and an additive. A method for making the nano magneto-rheological fluid wherein the nano magneto-rheological fluid has performance advantages such as no remanent magnetization, non-settlement, low viscosity, low abrasive rate for components, long service life, high reliability and fast and clear response.

16 Claims, 2 Drawing Sheets

(56) References Cited

FOREIGN PATENT DOCUMENTS

| | | | |
|---|---|---|---|
| JP | 2007-165482 | * | 6/2007 |
| JP | 2007165482 A | | 6/2007 |
| JP | 201194212 A | | 5/2011 |
| JP | 2014503575 A | | 8/2012 |

OTHER PUBLICATIONS

CN First Search Result in regards to CN Application CN 201510537836X dated Jan. 4, 2018.
CN Supplemental Search Results in regards to CN Application CN 2015105380707 on Published Feb. 20, 2019.
CN Supplemental Search Results in regards to CN Application CN 2015105380707 on Published Jul. 9, 2018.
CN First Search Result in regards to CN Application CN 2015105380707 Published on Nov. 20, 2017.
CN First Search Result in regards to CN Application CN 2016800501214 Published on Jun. 26, 2019.
EP Office Action in counterpart Application No. 16840766.6 dated Feb. 12, 2020 (3 Pages).
Magnetorheology of Submicron Diameter Iron Microwires Dispered in Silicone Oil, IOP Publishing, Smart Materials and Structures, vol. 17, No. 1, p. 15028, Published Jan. 4, 2008 (6 pp).

\* cited by examiner

NANO MAGNETO-RHEOLOGICAL FLUID AND PREPARATION METHOD AND DEVICE THEREOF

CROSS REFERENCE TO RELATED APPLICATION

This application is a continuation of PCT Patent Application Ser. No. PCT/CN2016/096635 filed on Aug. 25, 2016 which claims priority to Chinese Patent Application Ser. No. 201510538070.7 filed on Aug. 28, 2015 and Chinese Patent Application Ser. No. 201510537836.X filed on Aug. 28, 2015, the entire disclosures of which are incorporated herein by reference in its entirety.

BACKGROUND

1. Field of the Invention

The present disclosure relates generally to magnetorheological (MR) fluid, and more particularly to nanometric magnetorheological fluid. The present disclosure also relates to an apparatus and a method for fabricating nanometric magnetorheological fluid.

2. Related Art

A magnetorheological fluid is a liquid that exhibits a change in viscosity in response to a magnetic field applied. A stable suspension liquid system is composed of soft magnetic particles with high magnetic permeability and low remanence, which are uniformly dispersed in a magnetically impermeable carrier liquid with the aid of a surfactant. The operation principle of magnetorheological fluid is: in response to the applied magnetic field, each magnetic particle is polarized into a magnetic dipole, with each dipole attracting each other, forming in between two polar plates a chain structure like a bridge stretching between the polar plates, blocking the normal flow of the fluid, thereby rendering solid-like characteristics. When the applied magnetic field is removed, the fluid returns to its initial state, i.e., the magnetorheological fluid can undergo a fast and reversible conversion between a liquid state and a solidified state. The degree of solidification is in an inverse relationship with the current intensity being applied to produce the magnetic field, that is, the control of the current intensity will make possible for the precise control of the shear yield strength of the solidified magnetorheological fluid.

Magnetorheological fluids have been extensively studied over the years, and at present have been progressively used in a variety of devices to control damping, such as shock absorbers, vibration absorbers, prostheses and elastic seats. The rheology of the rheological fluid under the action of the magnetic field is ideally instantaneous, reversible, and its shear yield strength and the magnetic field strength has a stable correspondence there between, such that the intelligent control is very easy to achieve. Therefore, the magnetorheological fluid is a kind of intelligent material usable in a wide range of applications, with excellent performance, and the applications of the magnetorheological fluid are rapidly expanding.

The conventional magnetorheological fluid exhibits remanence phenomenon, wherein the remanent magnetic particles that are dispersed in the magnetorheological fluid cannot be fully restored back to the free flow state after the removal of the applied magnetic field. The remanence phenomenon affects the control process of the device operating with the magnetorheological fluid. In order to reduce the coercivity, the magnetic particles of the conventional magnetorheological fluid have a particle size of more than 0.1 μm, preferably a particle size of more than 1 μm (as disclosed in U.S. Pat. No. 6,203,717B1), which brings about another prominent problem that the magnetic particles in the magnetorheological fluid is easy to settle.

One of the reasons for the tendency of the magnetic particles to settle is that, the density of the oil fluid (0.7-0.95 g/cm$^3$) is very different from the density of the metal particles (for example, ferromagnetic particles of about 7.86 g/cm$^3$). Another reason is due to the fact that the magnetic particles in the conventional magnetorheological fluid have a large particle size (preferably having a particle size greater than 1 μm, i.e., 1000 nanometers, as disclosed in U.S. Pat. No. 6,203,717 B1, etc.), and the free settling/precipitation rate of the solid particles in the fluid medium is proportional to the square of the particle size thereof. The settlement of the magnetic particles material results in a non-uniform distribution of the magnetic particles in the fluid, disturbing the activity of the magnetorheological fluid. The settlement of the magnetic particles directly leads to the shortened life of the magnetorheological fluid, low reliability and eventually the failure of the magnetorheological fluid.

Some of the early magnetorheological fluids (as disclosed in U.S. Pat. Nos. 2,575,360, 2,661,825, 2,886,151, 6,203,717B1, etc.) are mainly composed of ferromagnetic powders and low-viscosity oil, which are susceptible to the settling phenomenon and the rate of settling is accelerated with the increase of the temperature. Thus, it is usually necessary to add various thickeners and suspending agents. Due to the addition in large quantities of these anti-settling components, the viscosity of the magnetorheological fluid is greatly increased, which increases the flow resistance (viscosity) of the fluid material in the state free of magnetic field. The initial viscosity of the magnetorheological fluid is large and the flow resistance is also large, which directly leads to the low performance of some devices, such as moving parts or devices, when no magnetic field is applied.

The presence of remanence (or referred to as "remanent magnetism") is a common defect of the conventional art, which will become progressively worse as the use time goes on, which not only may result in poor performance of the magnetorheological fluid and its application device, but also may cause low response-to-control performance and low reliability in the fluid and or device, and may additionally suffer a short service life.

In addition to particle settlement, large initial viscosity and the existence of remanence, another prominent technical problem in the existing magnetorheological fluids is the wear problem. Magnetic particles in the magnetorheological fluid may cause wear in the surface of the moving parts in contact with them. The larger the particle size of the magnetizable particles, the more serious may the abrasive wear.

Thus, as the technology develops, there is a need in the art for improved magnetorheological fluid and its fabrication method and apparatus, in order to overcome the drawbacks of the conventional art.

SUMMARY

The present disclosure proposes in a pioneer way the fabrication and provision of nanometric magnetorheological fluid, to solve the above-mentioned deficiencies in the art, among others. The disclosure also discloses an apparatus and a method for fabricating nanometric magnetorheological fluid.

If there is a remanence in the magnetically responsive particles (or referred to as "magnetic particles"), due to the remanence effect of the particles, the magnetorheological fluid cannot be completely restored to the free-flow state after the magnetic field is removed, which is disadvantageous to the control of the device operating with magnetorheological fluid. Therefore, there is requirement that the magnetically responsive particles of the magnetorheological fluid have the lowest possible coercivity. Coercivity is an important parameter in describing the remanence of ferromagnetic materials.

Throughout this patent application, it will be understood by those skilled in the art that "particle size" is intended to be used to represent and characterize the size of the particles. Unless otherwise specified, "particle size" refers to the particle diameter of the particles having a substantially spherical shape. Unless otherwise specified, "particle size" refers to "equivalent particle size" of the particles having a non-spherical shape.

Throughout this patent application, it will be understood by those skilled in the art that, if the magnetically responsive particles are non-spherical in shape, such as in flake, strip, needle, rod or cylindrical shape, the term "minimum unidimensional size" is defined as the smallest size among every one of the dimensions of the particle shape. For example, if the particle is of a flake shape, the term "minimum unidimensional size" refers to its size in the "thickness" dimension.

Throughout this patent application, it will be understood by those skilled in the art that, if the magnetically responsive particles are non-spherical in shape, such as in flake, strip, needle, rod or cylindrical shape, the term "maximum unidimensional size" is defined as the largest size among every one of the dimensions of the particle shape, i.e., the size in the length dimension of the particle in flake, strip, needle, rod or cylindrical shape.

The coercivity mechanism of the fine particle magnetic material is different from that of a bulk material, and the coercivity of the ferromagnetic particles is closely dependent on its size (see FIG. 1).

FIG. 1 shows the relationship between the coercivity and the particle size of magnetic particles. Within the micron scale, a decrease in the particle size usually results in an increase in coercivity, with the maximum value can be achieved in a single-domain critical size ($D_{SD}$). However, when the particle size of the magnetic particles decreases below the single-domain critical size ($D_{SD}$), conversely, the coercivity will decrease as the particle size decreases. When the particle size of the magnetic particles decreases below a nanometric superparamagnetic critical size ($D_{SP}$), the coercivity (i.e., coercivity) will drop to zero, at this moment, the original ferromagnetic material will become into a superparamagnetic material, wherein the superparamagnetic material is the one with its coercivity drops to substantially zero.

FIG. 2 shows the single-domain critical size ($D_{SD}$) and Superparamagnetic critical size ($D_{SP}$) for some ferromagnetic materials.

If the particle size of the magnetic particles is reduced to a certain nanometric range, the coercivity is surprisingly reduced to substantially zero or completely zero, under this circumstance, the original ferromagnetic material is converted into a superparamagnetic material, When these magnetic particles are used in a magnetorheological fluid, it is possible to obtain a novel nanometric magnetorheological fluid having a performance completely exceeding the conventional art.

The nanometric magnetorheological fluid fabricated according to the present disclosure may present such as the following advantages, as compared with conventional magnetorheological fluids (as disclosed in U.S. Pat. Nos. 2,575, 360, 2,661,825, 2,886,151, 5,645,752, 7,393,463B2, 6,203, 717B1 and 2006/0033069 A1).

A. Controllable Remanence, with Zero Remanence Being Achievable

Remanence phenomenon occurs in the conventional magnetically responsive particles. Because of remanence, the magnetorheological fluids cannot be completely restored to the free flow state after the applied magnetic field is removed. Moreover, the rising magnetization curve does not coincide with the decreasing magnetization curve, thereby affecting on the control process of the controller. The nanometric magnetically responsive particulate material of the disclosure make it possible to realize superparamagnetism, that is, such that the coercivity is substantially zero, so that the nanometric magnetically responsive particulate material make it possible to realize the controllable remanence, and even substantially zero remanence.

B. Hardly to Settle

The free settling rate of the fine solid particle in the fluid medium is proportional to the square of its particle size. In order to reduce the remanence, the conventional magnetically responsive particle has a preferred particle size of above 1 μm (see the Description of these patents). The material of the present disclosure has a particle size of less than 1/50 of that of the conventional material, with a settling rate in the fluid which is less than 1/2500 of that of the conventional material, that is, almost no settlement or settlement-induced stratification or stratification, so as to solve the problem of easy settlement of the magnetically responsive particles in the conventional magnetorheological fluid. The hard-to-settle state of the magnetic particles in the magnetorheological fluid of the present disclosure is that, at least 50%, preferably at least 60%, more preferably at least 80%, and most preferably at least 90% of the magnetic particles in the magnetorheological fluid will not settle at room temperature (25 degrees Celsius), during a period in which the magnetorheological fluid is allowed to rest for 1 week or more, preferably 2 weeks or more, more preferably 1 month or more, and most preferably 2 months or more, or even longer.

C. Reducing the Wear Rate of the Parts

The abrasive wear is closely related to the particle size of the abrasive grains. The particle size of the particulate material of the present disclosure may be less than 1/50 of the conventional material, thus the wear of the moving parts can be significantly reduced.

D. Low Initial Viscosity

Due to the low settling rate of the nanomaterials, it is not necessary to add anti-settling component of high viscosity into the carrier liquid. Since the magnetically responsive nanoparticles of the present disclosure can achieve zero-remanence phenomenon, i.e., there is substantially no remanent magnetization, magnetic rheological fluid can be restored to the free flow state once the applied magnetic field is removed. These factors all may make the initial viscosity of the magnetorheological fluid significantly reduced.

E. The device of the disclosure can realize continuous production, high production efficiency and low production cost.

F. Thermal Stability

The nanometric magnetorheological fluid material fabricated according to the present disclosure has good thermal stability.

More particularly, it is an aspect of the present disclosure to provide a nanometric magnetorheological fluid, comprising: nanometric magnetizable magnetic particles, wherein the magnetic particles have an average particle size or a minimum unidimensional size of less than 100 nanometers; and a fluid for use as a carrier liquid, wherein the magnetic particles are dispersed in the fluid.

It is another aspect of the present disclosure to provide a nanometric magnetorheological fluid, comprising: nanometric magnetizable magnetically-anisotropic magnetic particles, wherein the magnetic particles have an average particle size or a minimum unidimensional size of less than 99 nanometers; and a fluid for use as a carrier liquid, wherein the magnetic particles are dispersed in the fluid in a state being not prone to settle.

According to an aspect of the present disclosure, the particle size of the magnetic particles is below a nanometric superparamagnetic critical size ($D_{SP}$), which depends on the type of material of the magnetic particles.

According to an aspect of the present disclosure, the average particle size or minimum unidimensional size of the magnetic particles can be set to achieve superparamagnetism, for example less than 80 nanometers, preferably less than 50 nanometers, such as between 0.1 and 80 nanometers, preferably between 0.2 and 50 nanometers, most preferably between 0.5 and 20 nanometers, wherein the magnetic particles having a particle size or minimum unidimensional size smaller than 90 nanometers are preferably 50% or more, or even 70%, of the total magnetic particles.

According to an aspect of the present disclosure, the number of magnetic particles having a particle size or minimum unidimensional size of less than 80 nm is 50% or more, preferably 60% or more of the total magnetic particles.

According to an aspect of the present disclosure, the materials of the magnetic particles are selected from the group consisting of: iron, iron alloy, iron-cobalt alloy, iron-platinum alloy, iron oxide, iron nitride, iron carbide, carbonyl iron, nickel, cobalt, chromium dioxide, FePt, SmCo, NdFeB, stainless steel, silicon steel, and the combinations thereof.

According to an aspect of the present disclosure, wherein the fluid is an organic liquid, preferably α-olefin.

According to an aspect of the present disclosure, wherein the fluid further comprises additives selected from the group consisting of: a surfactant, a dispersant, an anti-settling agent, an organic thixotropic agent, a thickening agent, an anti-oxidant, lubricants, viscosity modifiers, flame retardants, organic clay-type rheological additives, sulfur compounds, and combinations of these additives. The amount of the additives is preferably from about 0.01% to about 20%, preferably from about 0.01% to about 10%, of the total volume of the magnetorheological fluid.

According to an aspect of the present disclosure, the volume of the magnetic particles accounts for about 10% to 70% of the total volume of the magnetorheological fluid.

According to an aspect of the present disclosure, the volume of the magnetic particles accounts for about 0.1% or more, for example greater than 0.2%, such as greater than 0.5%, preferably 0.5 to 10%, more preferably 0.8 to 5%, of the total volume of the fluid.

According to an aspect of the present disclosure, the nanometric magnetorheological fluid has a viscosity of about 0.2 to about 1000 centipoise, preferably from 1 to about 500 centipoise, in a state with magnetic field being applied and at a temperature of about 40° C.

According to an aspect of the present disclosure, the magnetic particles are of shape-anisotropy, and/or of magnetocrystalline-anisotropy, and/or of stress-induced magnetic anisotropy.

According to an aspect of the present disclosure, the shape-anisotropic magnetic particles have a non-spherical shape.

According to an aspect of the present disclosure, the non-spherical shape is selected from the group consisting of flake, strip, needle, rod, cylinder, prism, and any combination thereof.

According to an aspect of the present disclosure, the magnetic particles are in a state being not prone to settle, in which the magnetic particles are allowed to rest in the nanometric magnetorheological fluid for at least 1 week, preferably at least 2 weeks, more preferably at least 1 month, and most preferably at least 2 months without settlement or settlement-induced stratification. Or, at least 50%, preferably at least 60%, more preferably at least 80%, and most preferably at least 90% of the magnetic particles, does not settle or stratify during said period.

According to an aspect of the present disclosure, the magnetic particles are flake-like or strip-like or needle-like magnetic particles, the number of said flake-like or strip-like or needle-like magnetic particles accounts for 50% or more, preferably 80% or more, and more preferably 90% or more, of the total number of the magnetic particles in the nanometric magnetorheological fluid.

According to an aspect of the present disclosure, the flake or strip is an elongated flake or strip.

According to an aspect of the present disclosure, wherein the flake-shaped magnetic particles are magnetocrystalline-anisotropic and/or stress-induced magnetically anisotropic.

According to an aspect of the present disclosure, the magnetocrystalline-anisotropic magnetic particles have a non-cubic magnetocrystalline structure, such as hexagonal or prismatic crystal structure.

According to an aspect of the present disclosure, the nanometric magnetizable magnetic particles are magnetic particles capable of achieving superparamagnetism.

According to an aspect of the present disclosure, the nanometric magnetizable magnetic particles are magnetic nanoparticle having a core/shell structure with a shell coating.

According to an aspect of the present disclosure, the particle size or the minimum unidimensional size of the magnetic particles is between 0.05 $D_{SP}$ and 5 $D_{SP}$, preferably 0.05 $D_{SP}$-2$D_{SP}$, more preferably between 0.05 $D_{SP}$-1 $D_{SP}$, and most preferably between 0.1 $D_{SP}$ and 0.9 $D_{SP}$, with the single-domain critical size of the magnetic particles (i.e., the particle size of the magnetic particles is substantially equal to 1 $D_{SD}$) being excluded therefrom.

According to an aspect of the present disclosure, the magnetically responsive particles are in the form of a non-spherical shape, preferably in the form of a flake, a strip, a needle, a rod or a cylindrical shape, with a maximum unidimensional size between greater than 1 $D_{SD}$ and 100 $D_{SD}$, more preferably between 2 $D_{SD}$ and 100 $D_{SD}$, and most preferably between 5 $D_{SD}$ and 50 $D_{SD}$.

It is another aspect of the present disclosure to provide an apparatus for fabricating a nanometric magnetorheological fluid, the apparatus comprising: a ball mill for providing primary magnetic particles containing magnetic nanoparticles by ball milling a magnetic powder raw material; a separator located downstream of the ball mill and connected to the ball mill, the separator being arranged for receiving the primary magnetic particles from the ball mill, and for separating out secondary magnetic particles mainly containing magnetic nanoparticles from the primary magnetic particles; and an agitator for mixing the secondary magnetic particles with a carrier liquid and an additive, to form the nanometric magnetorheological fluid.

According to an aspect of the present disclosure, the apparatus may be used for the fabrication of nanometric magnetorheological fluids capable of achieving superparamagnetism.

According to an aspect of the present disclosure, the ball mill is a stirring ball mill.

According to an aspect of the present disclosure, the separator comprises a settling separator located downstream of the ball mill, for separating the primary magnetic particles by gravity and/or centrifugal force into a lower layer of fluid including non-desired coarse magnetic particles and an upper layer of fluid containing fine magnetic particles.

According to an aspect of the present disclosure, wherein said separator further comprises a magnetic separator located downstream of and connected to said settling separator, for receiving said upper layer of fluid containing fine magnetic particles from said settling separator, and for further separating the upper layer of fluid into a fluid containing the desired secondary magnetic particles and a fluid to be recovered containing undesired magnetic particles by application of a magnetic field, wherein the fluid containing the desired secondary magnetic particles being transferred to the agitator.

According to an aspect of the present disclosure, the settling separator is provided at its bottom with a switchable outlet for pumping the lower layer of fluid back to the ball mill.

According to an aspect of the present disclosure, the magnetic separator is provided with an outlet for pumping the fluid to be recovered back to the ball mill.

It is another aspect of the present disclosure to provide a method for fabricating a nanometric magnetorheological fluid, comprising the steps of: adding a magnetic powder raw material, an additive and a carrier liquid to a ball mill to conduct ball milling process, to fabricate primary magnetic particles containing magnetic nanoparticles; transferring the primary magnetic particles together with a portion of the carrier liquid, to a downstream separator, to separate out a fluid containing desired secondary magnetic particles and transfer it to an agitator; and further adding a carrier fluid and an anti-settling agent into the agitator to conduct agitation process, to form nanometric magnetorheological fluid.

According to an aspect of the present disclosure, the step of the separating comprising: separating out the primary magnetic particles together with a portion of the carrier liquid in a settling separator via settlement, to obtain an upper layer of fluid containing fine magnetic particles, and then delivering the upper layer of fluid to a magnetic separator.

According to an aspect of the present disclosure, a fluid containing the desired secondary magnetic particles is further separated out from said upper layer of fluid in said magnetic separator by application of a magnetic field, and said fluid containing the desired secondary magnetic particles being transferred to the agitator.

According to an aspect of the present disclosure, the method utilizes the apparatus for fabricating nanometric magnetorheological fluids as provided by the present disclosure, to fabricate nanometric magnetorheological fluids.

According to an aspect of the present disclosure, the additives comprise a surfactant and a defoaming agent.

As compared with conventional magnetorheological fluid, the nanometric magnetorheological fluid of the present disclosure has huge irreplaceable advantages, for example, no remanence, not prone to settle, low viscosity, low wear rate for the components, long service life, high reliability, fast and distinct response, excellent thermal stability and other performance advantages.

The magnetorheological fluid of the present disclosure may be applied to, but not limited to devices such as dampers, buffers, shock absorbers, vibration absorbers, human prosthesis and elastic seats, brakes such as automotive buffers, automotive shock absorbers, and precise machining equipment such as shock absorbers for machine tools, shock absorbers for high-speed train, and so on.

BRIEF DESCRIPTION OF THE DRAWINGS

The features, objects and advantages of the present disclosure will become more apparent from the following description taken in conjunction with the accompanying drawings in which.

DESCRIPTION OF THE ENABLING EMBODIMENT

Figure 1:
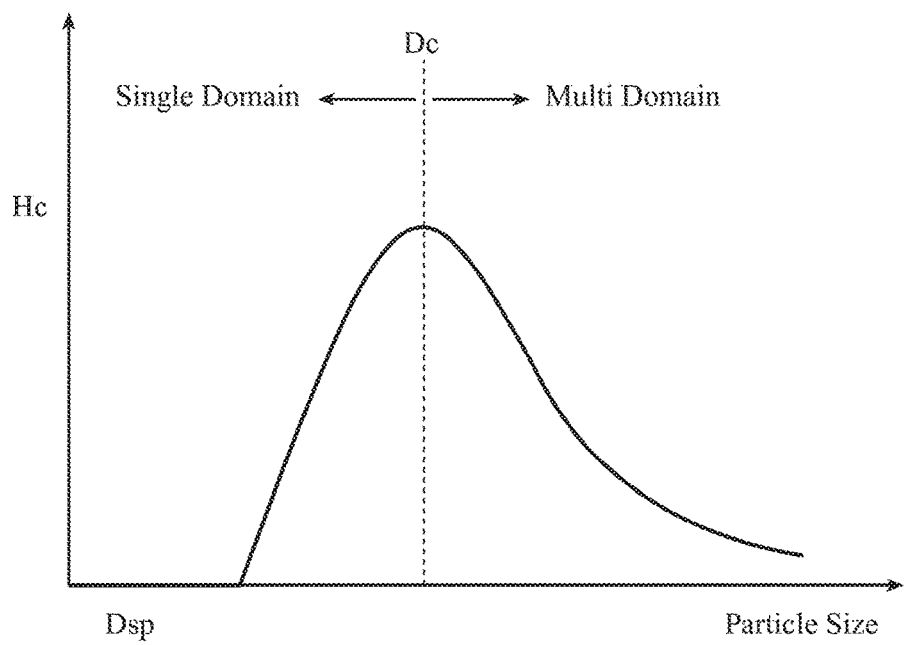
FIG. 1 is a graphical illustration of the relationship between the coercivity and the particle size of magnetic particles.
Figure 2:
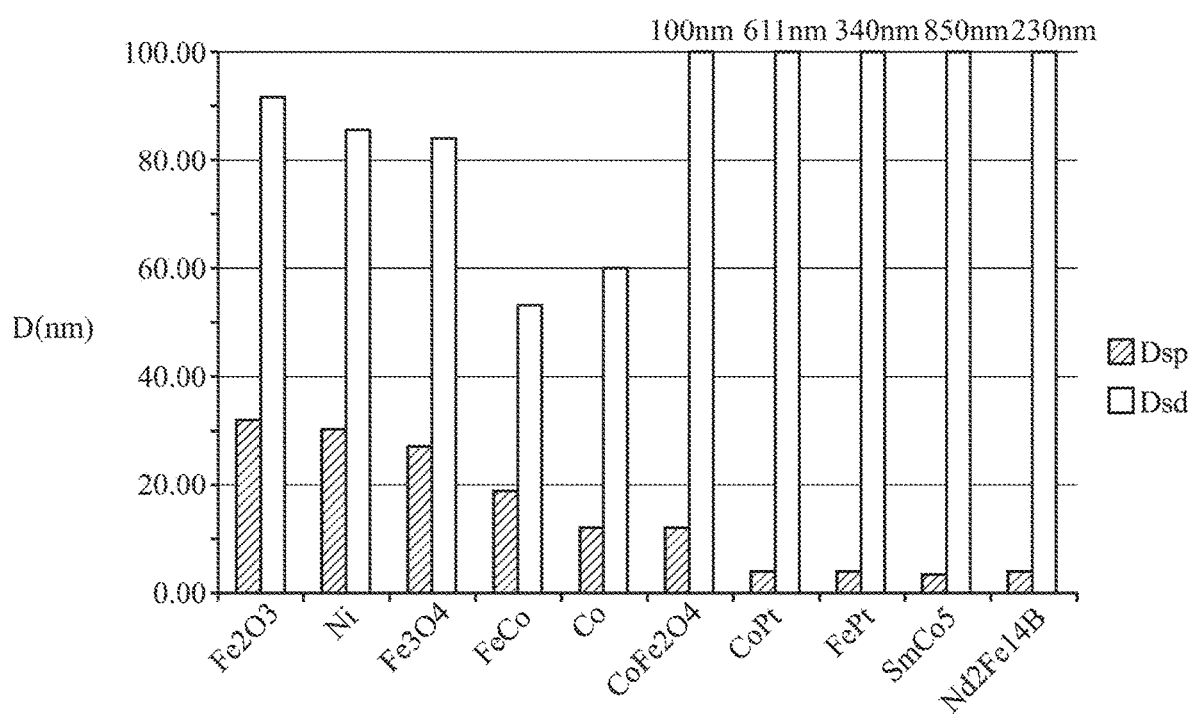
FIG. 2 is a graphical illustration of the single-domain critical size ($D_{SD}$) and superparamagnetic critical size ($D_{SP}$) of some ferromagnetic materials.

In the following description of the drawings and the detailed description, details of one or more embodiments of the disclosure will be set forth. Other features, objects, and advantages of the present disclosure will become apparent from the description, drawings, and claims.

Several particular embodiments of the present disclosure will be described in more detail as below.

Before further describing the embodiments of the present disclosure, the inventors would like to explain several terms in the present disclosure as follows.

In the present disclosure, the term "anisotropy" or "anisotropic" has meanings in several aspects.

Firstly, the term "anisotropy" or "anisotropic" may refer to the anisotropy in the shape of magnetic nanoparticles in a magnetorheological fluid, which can enable the magnetic nanoparticles to be quickly combined into a chain with a strong binding force and torsional force once magnetic field being applied thereto, the response to the applied magnetic field is fast and distinct, and the previous original state can be quickly restored once the magnetic field is removed. In contrast, for example, existing magnetic particles in the magnetorheological fluid are not only large in size, for example up to about 1 micron, but also their magnetic particles generally exhibit spherical or substantially spherical shape, making a slow response to the applied magnetic field.

Since the size of the magnetic particles in the magnetorheological fluid is in the order of nanometric range, the anisotropic shape of the magnetic nanoparticles belongs to microscopic shape, and needs to be sufficiently enlarged, for example, under SEM or TEM to clearly show. For example, but not limited to, the "anisotropic" shape of the magnetic nanoparticles is preferably non-spherical in shape, including but not limited to flakes, strips, rods, columns, prisms, cylinders, and the like. The inventor of the present disclosure has surprisingly found through experiment that, the preferred flake or strip or needle-like magnetic nanoparticles facilitate the rapid formation of the particle-chain after the magnetic field is applied, such that the magnetorheological fluid has excellent torsional resistance, in particular, elongated flake or strip or needle-like magnetic nanoparticles are preferred.

Secondly, the term "anisotropy" or "anisotropic" may refer to the anisotropy in the magnetocrystalline structure of the magnetic nanoparticles in the magnetorheological fluid. The inventor of the present disclosure has surprisingly found that, the different magnetocrystalline structures of the magnetic nanoparticles has significant effect on the properties of the magnetic nanoparticles after the magnetic field is applied, such as responsiveness, rapid formation of the particle-chain properties and torsional resistance. The magnetic nanoparticles with anisotropic magnetocrystalline structure may provide more superior performance in terms of responsiveness and fast formation properties of the particle-chain, torsional strength, and the like, as compared with the isotropic magnetocrystalline structure. For example, in this respect, the crystalline structure of the face-centered cubic (fcc) and body-centered cubic (bcc) structure is considered to be an isotropic magnetocrystalline structure, and thus is not preferred. By contrast, an anisotropic magnetocrystalline structure, such as a hexagonal crystallographic system, part of cubic crystallographic system, rhombohedral crystal system, etc., can provide remarkably improved properties after application of a magnetic field, and is therefore preferred.

It will be understood by those ordinary skilled in the art that, the term "superparamagnetism" or "superparamagnetic" means that, the remanence and coercivity of the magnetic particles are substantially zero with no remanence phenomenon occurring.

The conventional magnetorheological fluid fabrication technique cannot make the particle size or the minimum unidimensional size of the magnetic particles smaller than the superparamagnetic critical size ($D_{SP}$). In order to reduce the remanence, the preferred particle size of the conventional magnetic particles is 1 µm or more (as disclosed in U.S. Pat. No. 6,203,717 B1), bringing about the problem of easy settlement, high viscosity and wear on parts and other problems.

The apparatus of the present disclosure combines the settlement separation with the high-energy ball mill, utilizes the relationship between the particle settling rate and the particle size to automatically separate the particles that meet the requirements, and automatically return the coarse particles that do not meet the requirements back to the ball mill for further ball milling, to produce the novel magnetorheological fluid, i.e., nanometric magnetorheological fluid. The particle size of the magnetically responsive particles in this fluid may be smaller than that of the superparamagnetic conversion particle size $D_{SP}$ (obtainable by adjusting the settling conditions), thus showing superparamagnetic properties, with no remanence, anti-settlement, low initial viscosity and low wear rate of the components.

Selection of Superparamagnetic Magnetically Responsive Nanoparticle Material

Any known solid having high magnetic saturation strength can be used in the present disclosure, especially including paramagnetic, superparamagnetic and ferromagnetic elements and compounds. Examples of suitable magnetizable particles include iron and iron alloys (alloying elements including aluminum, silicon, cobalt, nickel, vanadium, molybdenum, chromium, tungsten, manganese, and/or copper), iron oxides (including $Fe_2O_3$ and $Fe_3O_4$), iron nitride, iron carbide, carbonyl iron, nickel, cobalt, chromium dioxide, stainless steel and silicon steel. For example, examples of suitable particles include pure iron powder, reduced iron powder, a mixture of iron oxide powder and pure iron powder. The preferred magnetically responsive particles are pure iron and iron-cobalt alloys.

Selection of Particle Size of Superparamagnetic Magnetically Responsive Nanoparticles The magnetically responsive particles of the present disclosure have a particle size in the order of nanoscale, preferably with a particle size or a minimum unidimensional size which is smaller than the superparamagnetic critical size ($D_{SP}$) of the selected material, preferably, the average particle size or the minimum unidimensional size is in the range of 0.1 $D_{SP}$-1 $D_{SP}$, more preferably between 0.1 $D_{SP}$ and 0.9 $D_{SP}$. Preferably, the number of magnetic particles having a particle size between 0.1 $D_{SP}$ and 0.9 $D_{SP}$ is at least 50%, preferably at least 70% or at least 80%, more preferably 90% or more, of the total number of magnetic particles.

Preferably, if the magnetically responsive particles are non-spherical in shape, such as flake-like, strip-like, needle-like, rod-like or cylindrical shape, the "minimum unidimensional size" may range between 0.1 $D_{SP}$-1 $D_{SP}$, more preferably between 0.1 $D_{SP}$ and 0.9 $D_{SP}$, with the single-domain critical size $D_{SD}$ being excluded therefrom.

Preferably, if the magnetically responsive particles are non-spherical in shape, such as flake-like, strip-like, needle-like, rod-like or cylindrical shape, the "maximum unidimensional size" may range between greater than 1 $D_{SD}$ and 100 $D_{SD}$, more preferably between 2 $D_{SD}$-100 $D_{SD}$, most preferably between 5 $D_{SD}$-50 $D_{SD}$.

Fabrication Method of Magnetically Responsive Nanoparticles

The fabrication method of nanometric magnetically responsive particulate material may include, but not limited to, co-precipitation method, chemical synthesis method with polyol solution, chemical reduction method, aqueous solution reduction method, polyol reduction method, sol-gel method, hydro-thermal method, ball milling method, and so on.

Carrier Liquid

The carrier liquid constitutes a continuous phase of the magnetorheological fluid. Non-volatile, non-polar organic oils may be used as the carrier composition, and suitable carrier liquid examples include silicone oil, hydraulic oil, engine oil, gearbox oil, α-olefin, and the like. The carrier liquid may also contain additives, such as organic clays, organic thixotropic agents, anti-settling agents, metal soaps and other additives, and so on, as described below.

[1] Organic Clay, Organic Thixotropic Agent

Addition of organic clay or organic thixotropic agent may control the viscosity and sagging of the magnetorheological fluid, and delay the settling of the magnetizable particles. Examples of optional organoclays include tallow bentonite, 2-methyl-2-hydrogenated tallow bentonite ammonium salts, and 2-methyl-2-hydrogenated tallow saladstone salts. The optional organic thixotropic agents may be Advitrol 100 rheological additives, and Thixatrol ST, Rheox 1 rheological additives.

[2] Anti-Settling Agent

Addition of anti-settling agent can prevent the settlement of magnetizable nanoparticles, the optional anti-settling agent includes M-P-A 2000X, M-P-A 60X anti-settling agent, or Y-25, Y-40 and YPA-100 anti-settling agents.

[3] Metal Soap

Additional thickeners include metal soaps, including aluminum stearate, Ethylhexanoic acid aluminum salt and slurry calcium linoleate, which together with the solvent can produce a gel structure that improves the suspension property of the magnetorheological fluid.

[4] Other Additives

Depending on the applications of magnetorheological fluids, other additives may be added, including dispersants, surfactants, antioxidants, lubricants, and the like.

In the present disclosure, the magnetic particles in the magnetorheological fluid are hardly to settle, and in this respect, the term "hardly to settle" should be understood as: not only during the interval of the operating state of the magnetorheological fluid, but also in the natural resting state of the magnetorheological fluid, for example, in the natural resting state at room temperature of about 25° C., there is no obvious or substantive settlement of the magnetic particles in the magnetorheological fluid which will affect the electromagnetic characteristics or normal operating performance of the magnetorheological fluid.

More precisely, if at least 50%, preferably at least 60%, more preferably at least 80%, and most preferably at least 90% of the magnetic particles in the magnetorheological fluid, in the natural resting state at room temperature, the settlement or stratification will not occur in the fluid after passing a period of 1 week or more, preferably 2 weeks or more, more preferably 1 month or more, and most preferably 2 months or more or longer, it is considered that the "hardly to settle" state as referred to in the present application is achieved.

The fabrication of the nanometric magnetorheological fluid of the present disclosure is further described below in connection with particular embodiments.

The disclosure will now be further described with reference to the accompanying drawings and particular embodiments.

Figure 3:
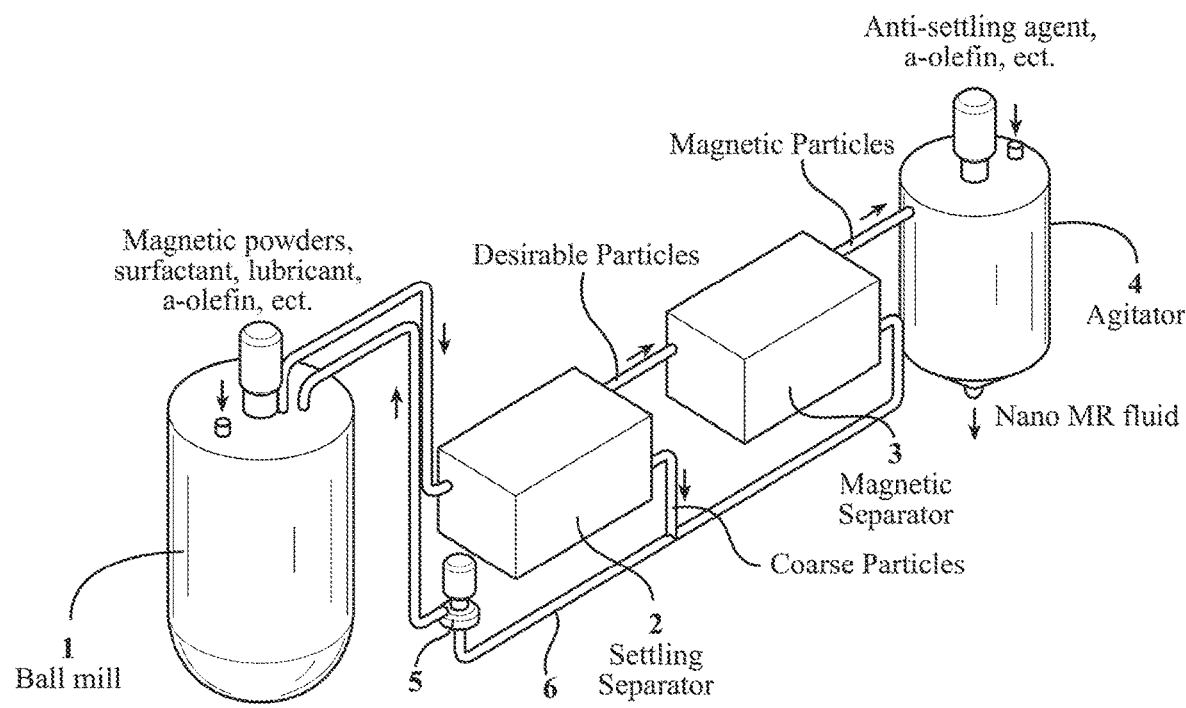
FIG. 3 is a schematic perspective view of an apparatus for fabricating a nanometric magnetorheological fluid according to one aspect of the present disclosure.
Figure 4:
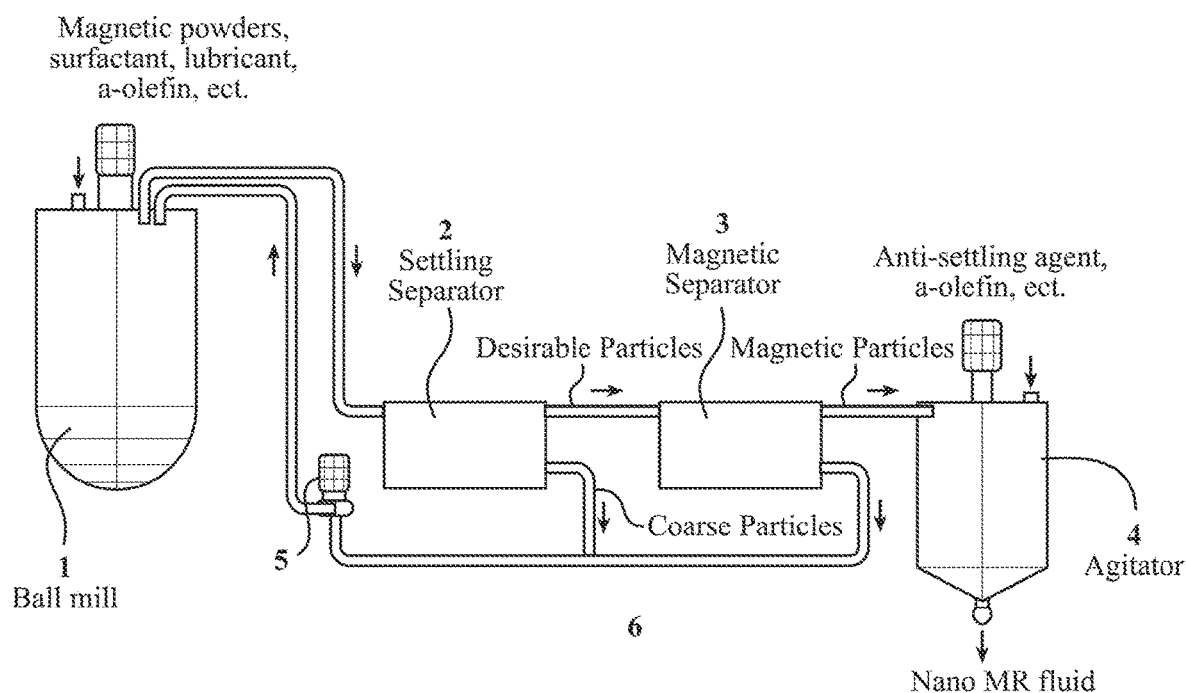
FIG. 4 is a schematic view of the embodiment of the apparatus for fabricating a nanometric magnetorheological fluid as shown in FIG. 3.

Referring to FIGS. 3 and 4, wherein FIG. 3 is a schematic perspective view of an apparatus for fabricating a nanometric magnetorheological fluid according to an aspect of the present disclosure, and FIG. 4 is a schematic view of the embodiment of the apparatus for fabricating a nanometric magnetorheological fluid as shown in FIG. 3. An embodiment of the apparatus for fabricating a nanometric magnetorheological fluid according to the present disclosure comprises a stirring ball mill 1, a settling separator 2, a magnetic separator 3, a pump 5, an agitator 4, wherein the settling separator 2 is preferably located downstream of the stirring ball mill 1 and is connected to the stirring ball mill 1 via a pipe line 6, the magnetic separator 3 is preferably located downstream of the settling separator 2 and is also connected to the settling separator 2 by means of a pipe line. Preferably, the magnetic separator 3 and the settling separator 2 are respectively provided with an outlet in connection with the stirring ball mill 1, so that the undesired residual liquid therein is selectively returned back to the stirring ball mill 1 by the pump 7 for re-processing.

The agitator 4 is preferably located downstream of the magnetic separator 3, and is also connected to the magnetic separator 3 by means of a pipe line, for receiving the fluid containing the desired magnetic nanoparticles from the magnetic separator 3.

(1) Grinding Process

The iron and cobalt salts are dissolved together in water, for example, by a polyol solution chemical synthesis method, to obtain an iron-cobalt mixed salt solution, a precipitant containing but not limited to oxalic acid, oxalate or carbonate is utilized, wherein ions of the precipitant react with Co and Fe ions to form precipitates of iron-cobalt compound salt, which will be subject to liquid-solid separation, drying, calcination, reduction and other processes, so as to obtain iron-cobalt alloy powder.

An iron-cobalt alloy (1:2) powder such as obtained via the above process, a grinding medium, a surfactant such as Tween 80, an antifoaming agent such as n-butanol, combined at a ratio (weight ratio: 70:29:0.9:0.1, n-butanol may be appropriately added thereto according to the amount of the foam) are put into a ball mill (an exemplary type of stirring ball mill 1 is JQM-500), and are ball milled therein at a ball-stock ratio of 10:1. This type of stirring ball mill 1 has a high rotational speed with a large milling force, thus the milling efficiency is also high.

Preferably, the milled slurry is recycled by means of a circulating pump to increase the utilization of the magnetic powder raw material.

α-olefin may be used as the grinding medium. According to a non-limiting example, a surfactant may be added, which may also be used as a dispersant to prevent the magnetic powder from agglomerating and bonding together. The use of defoaming agent is intended to eliminate the bubbles as generated by the addition of surfactant.

(2) Settling Separation Process

The ball milled slurry is then delivered to the settlement separator 2, such as a self-made gravity separator or centrifugal separator (Model LW50*1100), which utilizes gravitational or centrifugal forces to separate out the desired magnetic nanoparticles which meet the requirements (e.g., a particle size range of less than 50 nanometers, which size or size range may vary according to the particular type of magnetic powder, process requirements and application requirements), and then the desired magnetic nanoparticles are sent to the magnetic separator 3. However, those coarse magnetic particles whose size does not meet the requirements (e.g., particle size of more than 50 nm) are pumped back to the mixing ball mill 1, for further grinding.

According to a preferred embodiment, the ball mill slurry in the gravity separator or centrifugal separator can be heated to a temperature, for example, to a temperature of 25-50 degrees Celsius, to facilitate centrifugal separation.

(3) Magnetic Separation Process

According to a preferred embodiment, in addition to gravity-settling separation or centrifugal separation, a self-control apparatus can be used to generate electromagnetic energy by applying an exciting current to the magnetic nanoparticles, to further concentrate and separate out the superparamagnetic magnetic nanoparticles from the ball milling medium. The separated magnetic nanoparticles (containing part of the milling medium) may preferably be sent to the agitator 4 for the next agitating process. Wherein the ball milling medium with magnetic nanoparticles being separated out, may be passed through the pump 5 and sent back to the stirring ball mill 1 via the pipe line 7. According to a preferred embodiment of the present disclosure, the concentration of the separated magnetic particles can be controlled, by controlling the exciting current.

(4) Agitating Process

The content of the magnetic particles is characterized by the density value of the slurry containing the magnetic nanoparticles which is separated from the magnetic separator 3, and the α-olefin is added to the slurry, together with anti-settling agent (e.g., MP-A2000X, NL Chemical Co.) and lubricant (such as silicone oil), then the composition is stirred for about 1 hour via an agitator 4 (such as model DX-L500) to obtain the desired nanometric magnetorheological fluid.

Settlement Test

Test (a)

The nanometric magnetorheological fluid obtained after the above-mentioned agitating process (4) was placed for natural resting at room temperature, to test its settling performance. The result shows that, there is almost no settlement-induced stratification in the nanometric magnetorheological fluid after 2 weeks of natural resting. After 4 weeks of natural resting, no settlement-induced stratification was observed. After 8 weeks of natural resting, no settlement-induced stratification was observed. At least 50%, or even more than 90% of the magnetic particles in the nanometric magnetorheological fluid do not settle during the period.

Test (b)

The nanometric magnetorheological fluid obtained after the above-mentioned agitating process (4) was tested at room temperature, using a TZC-4 Type Particle Size Measuring Instrument manufactured by Shanghai Fangrui Instrument Co., Ltd., wherein the settling height was set to 2 cm, and the natural resting time was set to 96 hours. No occurrence of particles stratification or settlement was observed in this test.

Embodiments of the nanometric magnetorheological fluid, the method and the apparatus of the present disclosure have been described in detail with reference to the accompanying drawings. It should be understood by those skilled in the art, however, that the foregoing is merely illustrative of and describing some particular embodiments, without departing from the scope of the invention, particularly the scope of the claims. The scope of the invention is defined only by the appended claims.

What is claimed is:

1. A nanometric magnetorheological fluid, comprising:
nanometric magnetizable magnetic particles, wherein the magnetic particles are magnetically anisotropic magnetic particles and have an average particle size or a minimum unidimensional size of less than 99 nanometers; and
a fluid for use as a carrier liquid, wherein the magnetic particles are dispersedly distributed in the fluid in a state that is not prone to settle;
wherein the materials of the magnetic particles are selected from the group consisting of: iron, iron alloy, iron-cobalt alloy, iron-platinum alloy, iron oxide, iron nitride, iron carbide, carbonyl iron, nickel, cobalt, chromium dioxide, FePt, SmCo, NdFeB, stainless steel, silicon steel, and the combinations thereof; and
wherein the magnetic particles are shape-anisotropic, and/or magnetocrystalline-anisotropic, and/or stress-induced magnetically anisotropic.

2. The nanometric magnetorheological fluid according to claim 1, wherein the magnetic particles have an average particle size or a minimum unidimensional size between 0.1 and 80 nanometers, wherein the number of magnetic particles with a particle size or minimum unidimensional size smaller than 90 nm is 50% or more of the total magnetic particles.

3. The nanometric magnetorheological fluid according to claim 2, wherein the number of magnetic particles having a particle size or minimum unidimensional size between 0.1 and 80 nanometers accounts for 60% or more of the total magnetic particles.

4. The nanometric magnetorheological fluid according to claim 1, wherein the fluid is an organic liquid.

5. The nanometric magnetorheological fluid according to claim 1, wherein the fluid further comprises additives selected from the group consisting of: a surfactant, a dispersant, an anti-settling agent, an organic thixotropic agent, a thickening agent, an anti-oxidant, lubricants, viscosity modifiers, flame retardants, organic clay-type rheological additives, sulfur compounds, and combinations thereof.

6. The nanometric magnetorheological fluid according to claim 1, wherein the volume of the magnetic particles accounts for one of the following: 0.8-5% of the total volume of the nanometric magnetorheological fluid; and 10% to 70% of the total volume of the nanometric magnetorheological fluid.

7. The nanometric magnetorheological fluid according to claim 1, wherein the magnetic particles have a non-spherical shape, wherein the non-spherical shape is selected from the group consisting of a flake, a strip, a needle, a rod, a cylindrical shape, and any combination thereof.

8. The nanometric magnetorheological fluid according to claim 1, wherein the magnetic particles do not settle or stratify when the nanometric magnetorheological fluid rests at room temperature for a period of at least 2 weeks.

9. The nanometric magnetorheological fluid according to claim 7, wherein the magnetic particles are flake-shaped, strip-shaped or needle-shaped magnetic particles, and the number of the flake-shaped or strip-shaped or needle-shaped magnetic particles accounts for 50% or more of the total number of the magnetic particles in the nanometric magnetorheological fluid.

10. The nanometric magnetorheological fluid according to claim 1, wherein the minimum unidimensional size of the magnetic particles is between $0.05D_{SP}$-1 $D_{SP}$, with the single-domain critical size of the magnetic particles being excluded therefrom.

11. The nanometric magnetorheological fluid according to claim 10, wherein the magnetic particles are in the form of a flake, a strip, a needle, a rod or a cylindrical shape, with a maximum unidimensional size between 2 $D_{SD}$ and 100 $D_{SD}$.

12. The nanometric magnetorheological fluid according to claim 1, wherein at least 50% of the magnetic particles in the nanometric magnetorheological fluid do not settle or stratify when the nanometric magnetorheological fluid rests at room temperature for a period of at least 2 weeks.

13. A nanometric magnetorheological fluid, comprising:
flake-shaped nanometric magnetic particles, wherein the flake-shaped magnetic particles have a thickness of less than 100 nanometers; and
a fluid for use as a carrier liquid, wherein the magnetic particles are dispersed in the fluid.

14. The nanometric magnetorheological fluid according to claim 13, wherein the flake-shaped magnetic particles are magnetocrystalline-anisotropic and/or stress-induced magnetically anisotropic.

15. The nanometric magnetorheological fluid according to claim 13, wherein the maximum unidimensional size of the flake-shaped magnetic particles is between greater than 1 $D_{SD}$ and 100 $D_{SD}$.

16. The nanometric magnetorheological fluid according to claim 13, wherein at least 50% of the flake-shaped magnetic particles in the nanometric magnetorheological fluid do not settle or stratify when the nanometric magnetorheological fluid rests at room temperature for a period of at least 2 weeks.

\* \* \* \* \*